No. 783,019. PATENTED FEB. 21, 1905.
A. CISZEWSKI.
LIQUID FUEL FURNACE.
APPLICATION FILED JAN. 20, 1904.

3 SHEETS—SHEET 1.

WITNESSES
Wm Kuehne
John A. Percival

INVENTOR
Anton Ciszewski
BY Richards
ATTORNEYS

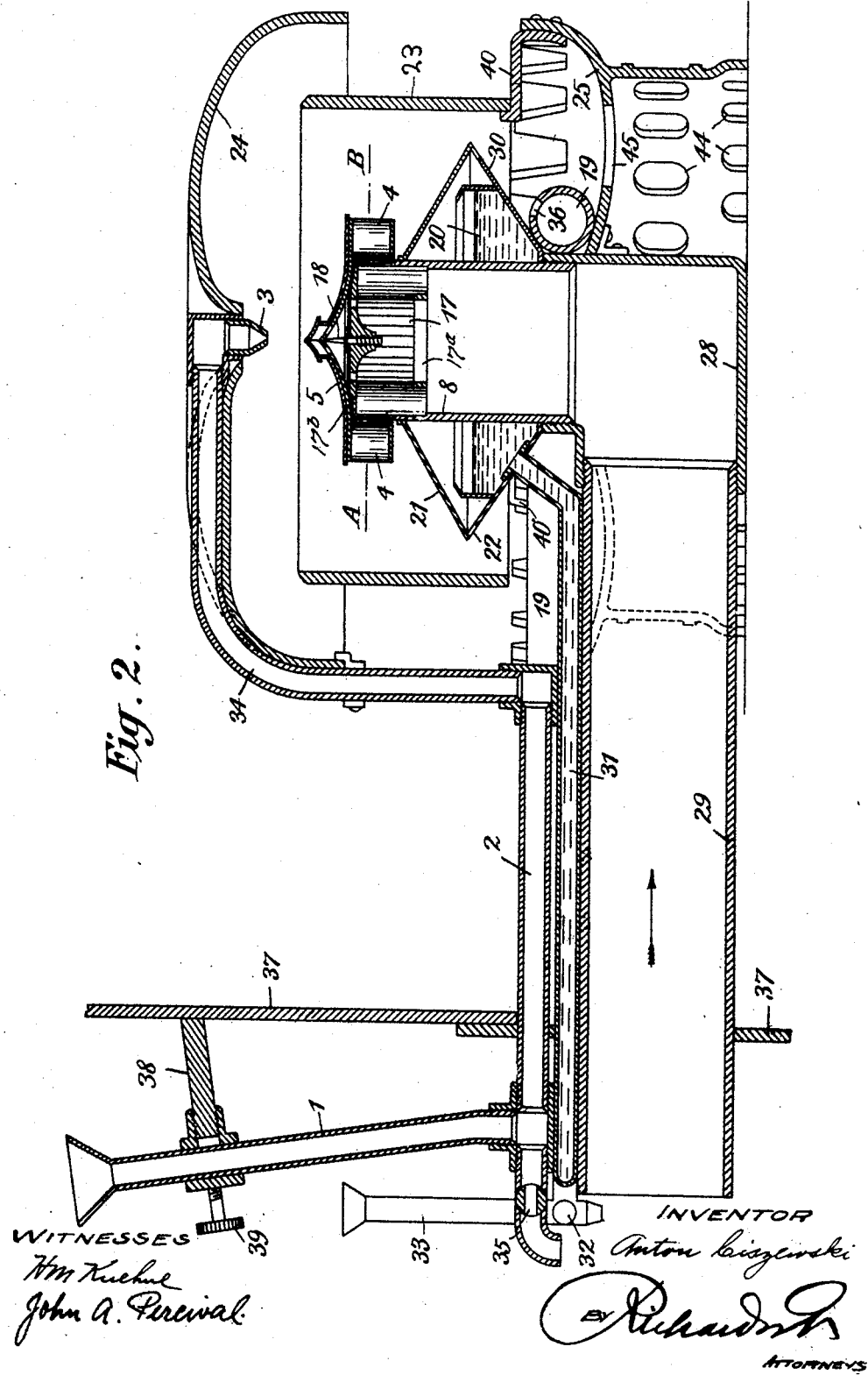

No. 783,019.                                             Patented February 21, 1905.

UNITED STATES PATENT OFFICE.

ANTON CISZEWSKI, OF MOSCOW, RUSSIA.

LIQUID-FUEL FURNACE.

SPECIFICATION forming part of Letters Patent No. 783,019, dated February 21, 1905.

Application filed January 20, 1904. Serial No. 189,839.

*To all whom it may concern:*

Be it known that I, ANTON CISZEWSKI, a subject of the Emperor of Russia, residing at Moscow, in the Empire of Russia, have invented a new and useful Liquid-Fuel Furnace, of which the following is a specification.

My invention relates to a furnace fired with naphtha or other similar liquid fuel and adapted for stoves, ovens, boilers, heating, and other apparatuses; and the objects of my invention are, first, to provide beneath a nozzle for the naphtha or other liquid fuel within the combustion-chamber a turbine adapted for spreading out and sprinkling the liquid fuel; second, to so arrange this turbine that it can be driven by the natural draft, the fresh air leaving the wheel being immediately mixed with the sprinkled liquid fuel to burn therewith, or that the turbine can be driven by steam generated from water under the action of the heat of the furnace; third, to provide means for conducting fresh air from without to the space beneath the periphery of the turbine-wheel to supplement the air leaving the turbine-wheel for completely consuming all smoke in case the turbine is driven by the draft or to mix with the sprinkled liquid fuel and to maintain the combustion in case the turbine is driven by steam, additional means being in this case provided for supplying additional air to insure the complete consumption of the smoke; fourth, to provide around the nozzle a disk or bell shaped cover of fireproof material for spreading out the flame; fifth, to provide means for generating the steam to prevent the liquid oil in the supply-tube from decomposition and to protect certain parts of the furnace from burning, and, sixth, to provide means for kindling the fire. I attain these objects by the arrangements illustrated in the accompanying drawings, in which—

Figure 1:
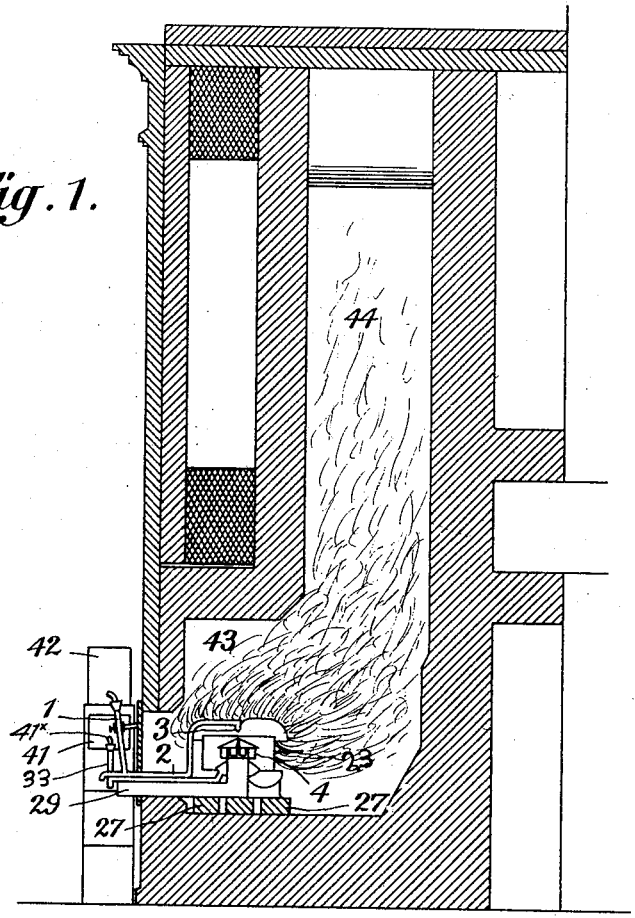
Figure 3:
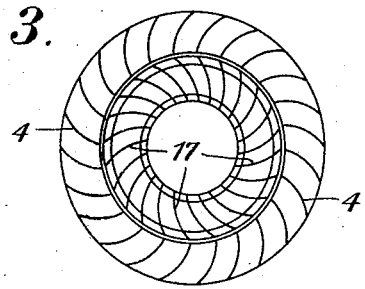
Figure 4:
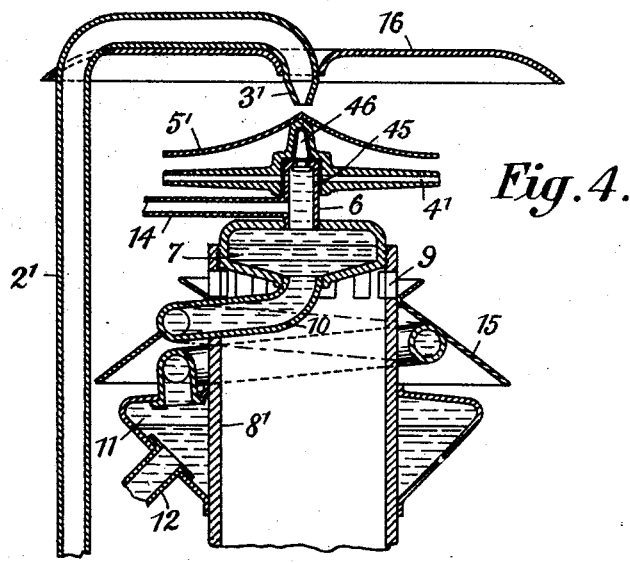
Figure 5:
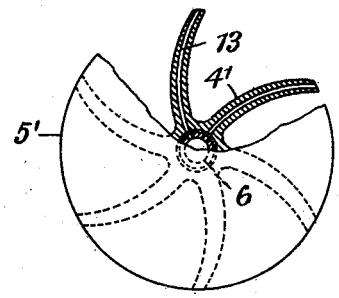
Figure 6:
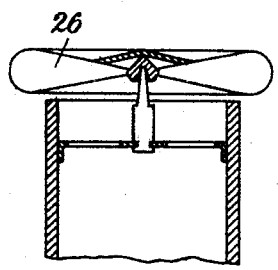

Figure 1 is a vertical longitudinal section through a stove provided with a liquid-fuel furnace according to my invention. Fig. 2 is a vertical longitudinal section, on an enlarged scale, through this liquid-fuel furnace. Fig. 3 is a horizontal section through the turbine on the line A B in Fig. 2. Fig. 4 is a vertical longitudinal section through a part of a modified liquid-fuel furnace. Fig. 5 is a plan of the turbine proper shown at Fig. 4 partly in section, and Fig. 6 is a vertical central section through another modification of the turbine and its support.

Similar characters of reference refer to similar parts throughout the several views.

In Fig. 1 I have shown, for example, a stove in which a liquid-fuel furnace is placed; but I do not describe the stove any further, as its construction is quite immaterial and it does not form a part of my invention. In the combustion-chamber 43 several bricks 27 27 are disposed on the bottom for supporting a circular perforated receptacle 25. (Shown at Fig. 2.) In the center of this receptacle a knee 28 is secured, which is connected with a horizontal tube 29 and a vertical tube 8, the three parts forming a channel for fresh air to be sucked in from without. On the upper edge of the knee 28 an annular water vessel 20 is placed and over it a conical cover 21, the periphery of which rests on the edge of the conical projection 30 of the water vessel. Around the periphery a plurality of holes 22 are provided in the conical projection 30 for the passage of the steam generated from the water in the vessel 20. Where so preferred, the several holes 22 may be replaced by an angular slit left between the edges of the projection 30 and the cover 21, so that the steam will escape on the whole periphery. The water vessel 20 is connected with a horizontal tube 31, placed on the tube 29 and terminating on the outside in a vertical funnel-tube 33, by means of a cock 32. Above the water-tube 31 a tube 2 for the naphtha or other liquid fuel is secured, which is connected with an inclined funnel-tube 1 without and with a bent tube 34 within and can be drained by means of a cock 35. On the large air-tube 29 a subsidiary air-tube 19 is placed which is bent around the vertical branch of the knee 28 and provided on the upper surface with perforations 36. All the horizontal tubes 29, 31, 2, and 19 are in any known manner rigidly connected with a vertical shutter 37, which also supports the inclined funnel-tube 1, by means of an arm 38 and set-screw 39. Thus all these parts form, with the circular receptacle 25, a self-contained whole which can be introduced through the door-opening of the stove and again withdrawn. After the introduction of this construction into the combustion-chamber 43 the shutter 37 can be secured on the outside of the stove in any known and approved manner.

The receptacle 25 is to receive chips, wool, and the like for kindling the fire, and its lower part may serve as an ash-pit. The perforations 44 44 and 45 may serve as air-holes. A vertical mixing and heating cylinder 23 is secured at a convenient height above the receptacle 25 by means of three supports 40, riveted to convenient teeth of the crown of the receptacle 25. A recess $8^a$ is provided in the upper part of pipe 8, into which recess the bent blades 17 of the turbine are inserted with the ring $17^a$ secured to said blades. The wheel 4 of the turbine is mounted to turn on a vertical stud 18. A metal ring $17^b$ is placed on the blades 17, into which the pivot 18 for the wheel 4 is screwed. The nozzle 3, connected with the bent tube 34, is placed exactly in the axis of the turbine and above the latter. A conical cover 5, tapering upward, is secured on the turbine-wheel 4 for receiving and spreading out the naphtha or other liquid fuel flowing out of the nozzle 3. A bell-shaped cover 24, of fireproof material, is preferably placed around the nozzle 3 and secured on the bent tube 34, and where so preferred, also on the receptacle 25 in any known manner.

The furnace is operated as follows: After filling the receptacle 25 with chips, wool, or the like and kindling the same the furnace is introduced into the stove and the shutter 37 secured. Then water is introduced from a suitable vessel 41 by means of a tap $41^\times$, the funnel-tube 33, and the tube 31 into the vessel 20. Now naphtha or other liquid fuel is turned on from a suitable vessel 42 by means of a tap and caused to flow through the funnel-tube 1, the tubes 2 34, and the nozzle 3, and at the same time by means of a pair of bellows or other device compressed air is introduced into the channel 29 28 8, so that this air passing through the guiding-blades 17 will put the wheel 4 into rotation. The liquid fuel falling on the running-cover 5 will be spread out and sprinkled by the centrifugal force, so that the fine particles of the liquid fuel will mix with the air leaving the wheel 4, and this mixture will be lighted by the flame developed from the chips, wool, or the like, after which the combustion of the fuel will take place. Any excess of the liquid fuel will fall on the conical cover 21 and run down into the chips, wool, or the like and burn therewith. The cylinder 23 serves for concentrating the heat and maintaining the combustion. The flame going upward strikes against the bell-shaped cover 24 and is thereby spread out before it passes upward through the flue 44. As soon as the stove is fairly in working order the artificial introduction of fresh air by means of the pair of bellows or other device can be dispensed with, and the natural draft of the stove will be sufficient to suck in the required quantity of fresh air for driving the turbine and maintaining the combustion. The water in the annular vessel 20 having been preliminarily heated by the fire developed from the chips, wool, or the like in the receptacle 25 will be further heated by the heat of the burning mixture of liquid fuel and air and by the heat radiating from the cylinder 23, so that steam will be generated. This steam escapes through the holes 22 22 or the annular slit between the edges of the projection 30 and the cover 21 and strikes against the internal wall of the cylinder 23 before it passes upward along it and mixes with the burning mixture. This steam serves for cooling the cylinder 23 and the cover 24, so that these parts are prevented from growing too hot, and also the liquid fuel in the bent tube 34 is protected from decomposition under certain circumstances.

To insure a complete consumption of the smoke if any should be produced, the subsidiary air-tube 19 may be used by opening its external end, when the draft of the fire will suck in additional air through the tube 19 and its perforations 36. Where it is so preferred, the artificial introduction of fresh air into the furnace on starting the same may be dispensed with, and the burning chips, wool, or the like in the receptacle 25 will heat the bent part of the air-tube 19, so that the air is preliminarily heated before it leaves the tube 19 through the perforations 36 and mixes and burns with the sprinkled liquid fuel dropping from the edge of the conical cover 21.

Instead of arranging the turbine to be driven by the draft of the furnace it may also be arranged to be driven by steam, in which case the furnace may be modified in the manner shown at Figs. 4 and 5. The upper end of the vertical tube 8' (corresponding to that, 8, in Fig. 2) is closed by a steam-chamber 7, which is connected with the water vessel 11 (corresponding to 20 in Fig. 2) by means of a coil 10. The vessel 11 is connected with a horizontal tube 12, arranged in a similar manner as the tube 31 in Fig. 2. On the steam-chamber 7 is secured a vertical central tube 6, provided with several lateral openings 45 and a pivot 46 for the turbine-wheel 4'. The latter is assumed to have six bent channels 13, through which the steam entering through the perforations 45 passes, so that the reaction of the steam-jets from the external ends of the channels 13 puts the turbine-wheel 4' into rotation. The turbine-wheel 4' is again provided with a conical cover 5', tapering upward for spreading out the liquid fuel flowing out of the nozzle 3'. Beneath the steam-chamber 7 there are several lateral holes 9 in the tube 8' through which the air sucked in by the draft escapes before it mixes with the sprinkled liquid fuel thrown off the cover 5' and with the steam leaving the wheel 4' and burns therewith. Where so preferred, the vertical tube 6 may be connected with a horizontal tube 14, passing to without through the shutter 37 in Fig. 2 for the purpose of artificially introducing fresh air by means of a pair of bellows or other device on starting the furnace. It is preferable to dispose above the water vessel 11 a conical cover 15 for catching the dropping fuel particles and conducting them to the chips, wool, or the like in the receptacle. The bent tube 2' and the disk 16 in Fig. 4 correspond to the bent tube 34 and the cover 24, respectively, in Fig. 2.

The construction of the turbine is quite immaterial. It may also be replaced by a fan 26, (shown at Fig. 6,) which requires no further explanations.

The subsidiary air-tube 19 may be omitted, if so preferred.

The liquid-fuel furnace described so far affords, in opposition to other furnaces of a similar kind, the great advantage that it enables comparatively cheap fuel to be utilized by burning in an economical manner without producing any smoke. The liquid-fuel furnace can be varied in many respects without deviating from the spirit of my invention. It can be adapted in any known manner to ovens, boilers, heating apparatus, and other apparatus.

What I claim as my invention, and desire to secure by Letters Patent, is—

1. In a liquid-fuel furnace, the combination with a source of naphtha, of a nozzle, means for conducting the naphtha from said source to said nozzle, a turbine beneath said nozzle and provided with a cover for spreading out and sprinkling the liquid fuel, means for driving said turbine, means for conducting fresh air from without and mixing it with the sprinkled liquid fuel, means for kindling the mixture, a cover surrounding said nozzle for spreading out the flame, and means in said furnace for generating steam from water and mixing it with the mixture.

2. In a liquid-fuel furnace, the combination with a source of naphtha, of a nozzle, means for conducting the naphtha from said source to said nozzle, a turbine beneath said nozzle and provided with a cover for spreading out and sprinkling the liquid fuel, a receptacle for chips, or wool, an air-tube leading from without through said receptacle, an annular water vessel surrounding said air-tube above said receptacle, means for conducting water from without to said annular water vessel, an upwardly-tapering cover above said water vessel, means for the escape of steam from the water vessel, a mixing and heating vertical cylinder concentric with said turbine and above said receptacle, means for driving said turbine and a cover surrounding said nozzle above said mixing and heating vertical cylinder for spreading out the flame.

3. In a liquid-fuel furnace, the combination with a detachable shutter closing the combustion-chamber, of a source of naphtha without, a nozzle in the combustion-chamber, means for conducting the naphtha from said source through said detachable shutter to said nozzle, a receptacle for chips, or wool, an air-tube connecting said detachable shutter with said receptacle and leading upward through the latter, a turbine mounted beneath said nozzle on the upper end of said air-tube to be driven by the draft and provided with a cover for spreading out and sprinkling the liquid fuel, an annular water vessel surrounding said air-tube above said receptacle, means for driving said turbine, means for conducting water from without through said detachable shutter to said annular water vessel, an upwardly-tapering cover above said water vessel, means for the escape of steam from said water vessel, a mixing and heating vertical cylinder concentric with said turbine and above said receptacle, and a cover of fireproof material surrounding said nozzle above said mixing and heating vertical cylinder for spreading out the flame.

In testimony whereof I have signed my name to this specification in the presence of two subscribing witnesses.

ANTON CISZEWSKI.

Witnesses:
  G. HARTWIN,
  ROBERT A. WILTON.